United States Patent Office 3,262,919
Patented July 26, 1966

3,262,919
TETRAPOLYMERS CONTAINING HYDROXYL AND CARBOXY GROUPS AND INKS MADE THEREFROM
Nicholas C. Bolgiano, Manor Township, Lancaster County, Pa., assignor to Armstrong Cork Company, Lancaster, Pa., a corporation of Pennsylvania
No Drawing. Filed May 2, 1963, Ser. No. 277,491
9 Claims. (Cl. 260—80.5)

This invention relates generally to addition polymers, and more particularly to addition polymers in a cross-linked or cured condition. Still more particularly, the invention relates to a cross-linked tetrapolymer having exceptional adhesion to glass under conditions of caustic soakings at elevated temperatures. Still more particularly, the invention relates to a printing ink for use on glass containers and the like, the ink being capable of withstanding the normal scouring, pasteurization, and sterilization procedures found in a bottling line.

Addition polymers as well known. Such polymers frequently are used in coating compositions whereby a clear or pigmented coating is applied to a wide variety of substrates such as metal, wood, leather, paper, ceramics, and glass. Despite the large number of polymers available and described, none is so far known that will withstand immersion in a 5% caustic bath for 30 minutes at 140° F. without serious degradation. When this resistance requirement is coupled with the need for ease of application to glass containers at high speed, it can be seen that the properties required of such polymers and inks made therefrom are unusual and quite stringent.

It is the primary object of the present invention to supply such a polymer. It is another object of the present invention to supply an addition tetrapolymer tailored and adapted to meet and surpass the above-mentioned requirements. It is another object of the present invention to present a printing ink suitable for printing in high speed printing apparatus on glass containers, the resulting printed matter possessing excellent resistance to abrasion, caustic baths, and heat.

The invention comprises a clear, addition tetrapolymer consisting essentially of (1) 40–60 parts by weight of a hydrocarbon selected from the group consisting of styrene and vinyl toluene, (2) 20–50 parts by weight of an alkyl ester of an acid selected from the group consisting of acrylic acid and methacrylic acid, said alkyl group containing 2–10 carbon atoms, (3) 1–7 parts by weight of an acid selected from the group consisting of acrylic acid and methacrylic acid, and (4) 3–25 parts by weight of a hydroxyl-containing ester of an acid selected from the group consisting of acrylic acid and methacrylic acid in which the esterifying group of the acid contains 2–10 carbon atoms, total parts by weight being 100, the ratio hydroxyl groups:carboxyl groups in the tetrapolymer being in the range 3:1 to 8:1.

The presence of both hydroxyl groups and carboxyl groups along the backbone of the tetrapolymer of the present invention appears to be primarily responsible for the unexpectedly excellent adhesion to glass and resistance to caustic of the final printing ink. Additionally, the ratio of hydroxyl groups to carboxyl groups appears to be of outstanding importance. The hydroxyl groups are present in substantial excess of the carboxyl groups.

The hydroxyl groups serve as cross-linking sites during the cure of the tetrapolymer in the presence of the cross-linking agent to be described below. Polymers which do not contain hydroxyl groups and carboxyl groups within the ranges stated above do not have such excellent and unpredictable properties when the polymer is used as the base of a printing ink for glass containers.

The styrene or vinyl toluene supplies hardness to the cured polymer, along with abrasion resistance. Amounts of styrene or vinyl toluene smaller than the stated minimum will produce a final film and printing ink of insufficient hardness. Amounts greater, however, will introduce brittleness into the final cured film, thus enabling the film to be more readily chipped on bottle lines.

The alkyl ester of acrylic acid or methacrylic acid serves to impart some flexibility and plasticity to the cured film by virtue primarily of the alkyl group present in the ester. This alkyl group contains 2–10 carbon atoms, and includes the ethyl, propyl, butyl, pentyl, hexyl, heptyl, octyl, nonyl, and decyl groups. Branched alkyl groups containing the above-stated number of carbon atoms are useful, and in fact, the 2-ethylhexyl group is preferred. Amounts of the alkyl ester outside of the stated ranges will produce a film which is too brittle or too soft where too small or too large amounts are used as compared with the amounts stated.

The acrylic acid or methacrylic acid may serve to some extent as cross-linking sites in the tetrapolymer while at the same time supplying some rigidity and stiffness to the cured polymer film. More important, the carboxyl groups probably contribute to the excellent adhesion to glass of the cured tetrapolymer. Both adhesion to glass and toughness of film, as well as caustic resistance are reduced where acrylic acid or methacrylic acid are used in amounts outside of the stated range.

The final ingredient in the tetrapolymer is the hydroxyl-containing ester of acrylic acid or methacrylic acid. The term "hydroxyl-containing ester" is meant simply to define an ester of acrylic acid or methacrylic acid containing a hydroxyl group. The esterifying group may be those alkyl groups from ethyl to decyl containing 2–10 carbon atoms. The alkyl group may carry the hydroxyl group, or the acid may carry the hydroxyl group. A preferred species is 2-hydroxyethyl methacrylate. The hydroxyl group will be positioned somewhere along the chain of the tetrapolymer backbone after polymerization. Amounts of the hydroxyl-containing ester outside of those listed will produce an excess or scarcity of the hydroxyl sites and thus change the cross-linking characteristics during cure, producing a cured polymer having properties outside of those desired for the purposes described herein. A preferred ratio of hydroxyl groups:carboxyl groups is 5:1.

All the parts by weight mentioned above for the four ingredients of the tetrapolymer are based on a total parts by weight of 100. Put another way, the parts by weight as stated in defining the various ingredients may also be read directly as percentages by weight.

One of the most important features of the tetrapolymer of the present invention is the maintenance of the defined ratio 3:1 to 8:1 of hydroxyl groups to carboxyl groups along the polymer backbone. Reaction rate mechanisms with the cross-linking agents to be described are such that different cured polymers are produced if the ratio of hydroxyl groups to carboxyl groups is outside of those defined. Not only is the adhesion to glass affected by the ratio, so is toughness and resistance to caustic. During cure of the tetrapolymer, it is possible to utilize too many sites for cross-linking purposes, thus producing a tightly cured and well cross-linked polymer which will not adhere to glass. The tetrapolymer of the present invention is peculiarly adapted to meet the several requirements stated above.

The relative amounts of the four ingredients and the structure of the tetrapolymer of the present invention are sufficiently definitive in producing the unusual properties of the polymer that the properties remain substantially unchanged whether the polymer is produced by solution methods or by emulsion methods, an unexpected and unusual situation.

Normal and known methods are used in preparing the polymer. By the solution method, a suitable solvent system for dissolving the finished tetrapolymer will be prepared. Aliphatic hydrocarbon solvents may be used alone or in mixture with esters such ethyl carbitol acetate. Aromatic solvents such as toluene and xylene may be used, again preferably mixed with additional solvents such as esters or alcohols. The alcohols will preferably be higher boiling alcohols such as pentanol in order to improve printing qualities of the final ink.

The four monomers are admixed and introduced into the solvent system which is maintained at an elevated temperature preferably in the range of about 120–200° F. To some extent, the temperature will depend on the particular catalyst which is used during the polymerization. The catalyst may be any of the usual peroxides or persulfate systems. Benzoyl peroxide and potassium persulfate are examples of these. The catalysts will be used in known amounts, generally in an amount of 0.1–2% by weight.

The monomer mixture is added over a period of time to a stirred mixture of the solution containing the initiator. The reaction kettle is maintained under an inert atmosphere such as nitrogen. Addition of the monomers may extend over a 5-hour period or longer, depending on the temperature of the solvent medium.

A similar process is used in an emulsion system. The peroxide or persulfate may be added to sufficient water along with an emulsifying agent such as a nonionic or anionic emulisfying agent of known type. The mixture of monomers again is added slowly with stirring. It is frequently desirable to neutralize the resulting emulsion at the end of the reaction period to a neutral pH using, preferably, ammonium hydroxide. In both the solution and emulsion processes, the monomer mixture is added in sufficient amount to produce a solution or emulsion containing 40–60% by weight polymer solids. Both processes produce a tetrapolymer having recurring, pendant, free carboxyl groups and hydroxyl groups.

The polymer solution or emulsion may be used directly in the manufacture of printing inks by incorporating suitable pigments in the solution or emulsion. It is preferred that the polymer solids in the ink run about 30–45% by weight, while the pigment system will generally run about 15–45% by weight. Viscosity of the ink may be controlled to some extent by the addition of solvents or water as needed. In accordance with usual ink-making procedures, the polymer, the pigment, and any additional diluent or thinner may be run through a paint mill or other suitable device for grinding pigments in the presence of binder.

The ink may be applied to glass containers by silk screen, offset, or other suitable procedures.

It is essential that a curing or cross-linking agent be admixed with the polymer prior to cure in order to form the tough, hard, printed label sought by the present invention. The cross-linking agents contemplated by the present invention are the cyclic acetals. Examples of such acetals are the spirobi (meta-dioxanes) such as dicrotonylidene pentaerythritol, diallylidene pentaerythritol, and diethylidene pentaerythritol of the general formula

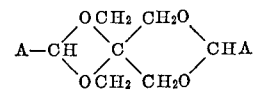

where A is an alkyl or alkylene radical containing 1–3 carbon atoms, such as methyl, vinyl, or methyl-substituted vinyl.

There may also be used the monocyclic-1,3-acetals of the general formula

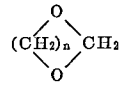

When $n$ equals 5 in the above formula, the compound is 1,3-dioxocane; when $n$ equals 4 in the above formula, the compound is 1,3-dioxepane; when $n$ equals 3 in the above formula, the compound is 1,3-dioxane; and when $n$ equals 2 in the above formula, the compound is 1,3-dioxolane. When any of these cyclic acetals are used to cross-link the described tetrapolymer of the present invention, the carboxyl groups are not particularly active in the cross-linking reaction, while the hydroxyl groups are quite reactive in the reaction.

The acetal cross-linking agents will be used in an amount of 4–20 parts by weight of the acetal per 100 parts by weight of the tetrapolymer of the present invention. One equivalent of acetal per hydroxyl equivalent, approximately, will be used. The most convenient method for adding the acetal cross-linking agent is to take up the acetal in a small amount of the solvent system used in the ink—or in water—and then add the solution or mixture to the tetrapolymer or to the ink. If the ink is to be stored for extended periods of time, the acetal should be stored separately and not added to the ink until just prior to the use of the ink. The cross-linking agent should be well stirred into the ink or the tetrapolymer in order to insure thorough blending of the mixture.

Once the formulation is completed by the addition of the cross-linking agent to the ink or to the tetrapolymer solution or emulsion, the mixture may be spread, printed, rolled, or otherwise applied to glass and subsequently cured. Curing is carried out at elevated temperatures. Curing temperatures are in the range of 300–500° F., and longer periods of time are needed at the lower temperatures. Ink cure is preferably carried out in the 400–475° F. range, and in this range, 25 minutes are required at 400° F., 20 minutes at 425° F., and 15 minutes at 475° F.

Once the label has been printed on glass, prolonged soaking in 3–5% caustic solution at elevated temperatures as high as 160° F. will not produce serious degradation of the polymer film. Glass containers having labels printed as described above will be able to withstand both the hot caustic soak and the mechanical jostling accompanying a normal bottle line.

The following examples illustrate several embodiments of the invention. All parts are by weight unless otherwise stated.

*Example 1*

A solvent system was made up of 3,600 parts of an aromatic hydrocarbon fraction (Solvesso 150) and 628 parts of ethyl carbitol acetate. To the mixture was added 80 parts benzoyl peroxide, and the mixture was heated with stirring to 160° F. in an autoclave. The monomer mixture was made by mixing 2,376 parts styrene, 1,662 parts 2-ethylhexyl acrylate, 154 parts acrylic acid, and 780 parts 2-hydroxyethyl methacrylate. The monomer mixture was added to the hot stirred solvent mixture over a period of 6 hours. The solids content of the resulting solution was 54.8% by weight, and the solution had a viscosity of 16,000 centipoises.

A series of mixtures of the above-described solution was made with several cross-linkers. The following table shows the ingredients and amounts.

| Ingredients | Parts | Parts | Parts | Parts |
|---|---|---|---|---|
| Polymer solution | 100 | 100 | 100 | 100 |
| Dicrotonylidene pentaerythritol | 8 | | | |
| Diallylidene pentaerythritol | | 8 | | |
| 1,3-dioxocane | | | 8 | |
| Diethylidene pentaerythritol | | | | 8 |

The well-stirred mixtures were rolled onto glass plates, cured for 15 minutes at 350° F. in an oven. All of the coatings after cure had satisfactory resistance to a 5% caustic bath for 30 minutes maintained at 140° F.

An ink was made using 60 parts of the above-described tetrapolymer solution containing 54.5% solids and 40 parts of pigment grade titanium dioxide (Du Pont R-900). The mixture was stirred and passed through a three-roll mill. Eight parts of carbitol acetate was added as a thinner after grinding.

Just before printing, 4.8 parts of dicrotonylidene pentaerythritol was taken up in a little carbitol acetate and thoroughly stirred into the ink.

Labels were printed on glass containers using this white ink both by the silk screen process and by the offset process. On curing at 425° F. for 20 minutes, the glass containers resisted a caustic wash of 5% caustic maintained at a temperature of 160° F. for 20 minutes.

A forest green ink was prepared by the following formulation:

Ingredients: Parts
Polymer solution, 54% solids _____ 1,500
White pigment, TiO₂ _____ 162
Blue pigment (BT-284-D) _____ 162
Yellow pigment (YT-459-D) _____ 162

The above mixture was passed through a three-roll paint mill twice and thinned with 8 parts of carbitol acetate. There was then added 72 parts of dicrotonylidene pentaerythritol with thorough stirring.

Glass containers printed with this rich, forest green ink and cured at 425° F. for 20 minutes withstood caustic soak at elevated temperatures and were highly resistant to abrasion due to jostling and the rubbing of bottles against one another during processing on a bottle line.

*Example 2*

The following series of solution polymers was made using the following ingredients in the amounts indicated.

| Ingredients | Run No. 1 | 2 | 3 | 4 | 5 | 6 |
|---|---|---|---|---|---|---|
| Aliphatic hydrocarbon (Solvesso 150) | | | 210 | | | 210 |
| Xylene | 210 | 210 | | 210 | 210 | |
| Pentanol | | | 38 | | | 38 |
| Carbitol acetate | 40 | 40 | | 40 | 40 | |
| Styrene | 115 | 115 | 119 | 115 | 115 | 119 |
| 2-ethylhexyl acrylate | | | 83 | | | 83 |
| Butyl acrylate | 85 | 119 | | 85 | 119 | |
| Methacrylic acid | 8 | 2 | | 8 | 2 | |
| Acrylic acid | | | 8 | | | 8 |
| Alpha-methylol ethyl acrylate | 40 | 12 | 39 | | | |
| Propylene glycol monoacrylate | | | | 40 | 12 | 39 |
| Benzoyl peroxide | 4 | 4 | 4 | 4 | 4 | 4 |

Dicrotonylidene pentaerythritol was dissolved in carbitol acetate and added to each of the above-mentioned runs to form a mixture of polymer and cross-linking agent as shown in the following table:

| Sample No. | Polymer | Cross-Linker, Parts | Carbitol Acetate, Parts |
|---|---|---|---|
| A | Run 1 | 7 | 7 |
| B | Run 2 | 7 | 7 |
| C | Run 2 | 3 | 5 |
| D | Run 3 | 7 | 7 |
| E | Run 4 | 7 | 7 |
| F | Run 5 | 7 | 7 |
| G | Run 5 | 3 | 5 |
| H | Run 6 | 7 | 7 |

All of the above samples performed satisfactorily in the caustic tests except sample B and sample F, which failed. However, sample C is identical with sample B save for the reduced amount of cross-linking agent, and sample C passed. Sample F is identical with sample G save for the reduced amount of cross-linking agent, and sample G passed. The larger amount of cross-linking agent produced failure in the caustic test presumably by tying up either too many hydroxyl groups, or some of the carboxyl groups on the polymer backbone.

*Example 3*

Into a 3 liter, multineck flask was placed 1,268 parts water, 135.2 parts sodium lauryl sulfate (Sipex SB, 29.6% solid), and 7.2 parts $(NH_4)_2S_2O_8$. The solution was maintained at a temperature in the range of 80-85° C. while a mixture of monomers was dripped into the solution over a period of 5 hours. The monomer mixture consisted of 472.2 parts styrene, 332.4 parts 2-ethylhexyl acrylate, 30.8 parts acrylic acid, and 156 parts 2-hydroxyethyl methacrylate. After the monomer was all in, the solution was maintained for 1 hour at a temperature of 80-85° C., and cooled. Sufficient 5% ammonium hydroxide was then added to produce a pH of 7.

To 100 parts of the above-described emulsion was added 3 parts of dicrotonylidene pentaerythritol followed by stirring for 1 hour. The emulsion was diluted by adding 1,000 parts of water. A clean glass container was then dipped into the dilute solution, and placed in an oven maintained at 400° F. for 20 minutes.

The resulting coating adhered strongly to glass, resisting abrasion, and immersion in hot, caustic solution.

I claim:
1. A clear addition tetrapolymer having, in the cured condition, excellent resistance to hot caustic solution and excellent adhesion to glass, the tetrapolymer consisting essentially of (1) 40-60 parts by weight of a hydrocarbon selected from the group consisting of styrene and vinyl toluene, (2) 20-50 parts by weight of an alkyl ester of an acid selected from the group consisting of acrylic acid and methacrylic acid, said alkyl group containing 2-10 carbon atoms, (3) 1-7 parts by weight of an acid selected from the group consisting of acrylic acid and methacrylic acid, and (4) 3-25 parts by weight of a hydroxyl-containing ester of an acid selected from the group consisting of acrylic acid and methacrylic acid in which the esterifying group contains 2-10 carbon atoms, total parts by weight being 100, the ratio hydroxyl group: carboxyl group in the tetrapolymer being in the range 3:1 to 8:1.

2. A printing ink for glass containers containing the tetrapolymer of claim 1, pigment, a solvent system, and an acetal cross-linking agent for the tetrapolymer.

3. A glass container having thereon the printed ink of claim 2.

4. A tetrapolymer according to claim 1 consisting essentially of styrene, 2-ethylhexyl acrylate, acrylic acid, and 2-hydroxyethyl methacrylate.

5. A printing ink containing the polymer of claim 4, pigment, solvent system, and an acetal cross-linking agent for the polymer.

6. A glass container having thereon printed material of the ink of claim 5.

7. A tetrapolymer according to claim 1 wherein the ratio hydroxyl groups:carboxyl groups is 5:1.

8. A curable polymeric system comprising a solution of the tetrapolymer of claim 1 and 4–16 parts by weight per 100 parts by weight of said tetrapolymer of a crosslinking agent consisting essentially of an acetal.

9. A printing ink comprising the cured composition of claim 8 as a binder therefor.

References Cited by the Examiner

UNITED STATES PATENTS

| | | | |
|---|---|---|---|
| 2,681,897 | 6/1954 | Frazier et al. | 260—86.7 |
| 2,962,471 | 10/1960 | Lang et al. | 260—80.5 |
| 3,056,764 | 10/1962 | Graham et al. | 260—80.5 |
| 3,082,184 | 3/1963 | Falgiatore et al. | 260—30.4 |

JOSEPH L. SCHOFER, *Primary Examiner.*

W. HOOVER, *Assistant Examiner.*